J. R. FOUCH.
TRACTOR.
APPLICATION FILED JUNE 17, 1919.

1,342,401.  Patented June 1, 1920.

Inventor
James R. Fouch
by Westall and Wallace
his Attorneys

UNITED STATES PATENT OFFICE.

JAMES R. FOUCH, OF LOS ANGELES, CALIFORNIA.

TRACTOR.

1,342,401.          Specification of Letters Patent.     Patented June 1, 1920.

Application filed June 17, 1919. Serial No. 304,884.

*To all whom it may concern:*

Be it known that I, JAMES R. FOUCH, a citizen of the United States, residing at Los Angeles, in the county of Los Angeles and State of California, have invented new and useful Improvements in Tractors, of which the following is a specification.

This invention relates to an improvement for protecting the driving mechanism of tractors.

Tractors are used in the open, and through sand, soft loam, dust and mud. The problem of protecting the working parts of the machinery, especially the mechanism driving the traction wheels or track, from dirt, dust and mud presents difficulties which have not heretofore been satisfactorily solved.

It is an object of this invention to provide means for protecting an inclosed driving mechanism by blowing a blast through the openings where dust and the like would otherwise enter.

Figure 1:
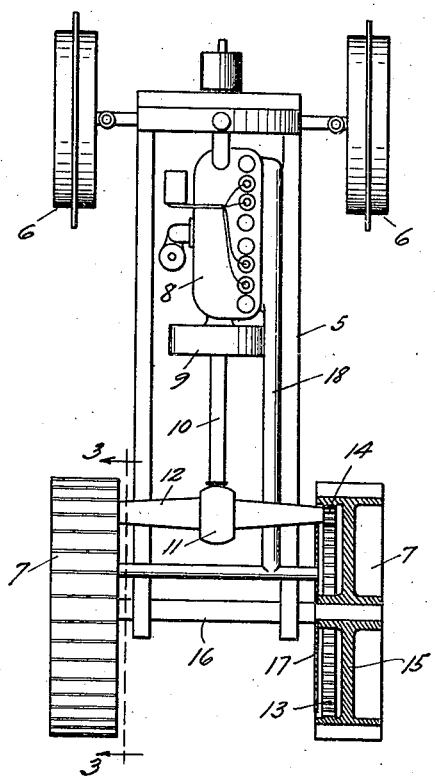
Figure 2:
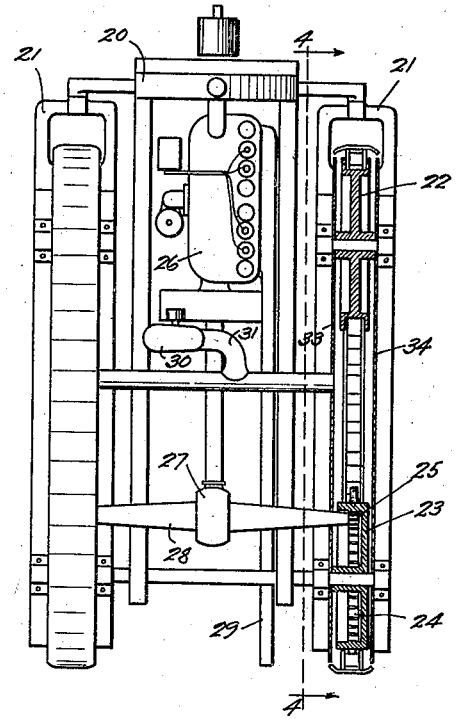
Figure 3:
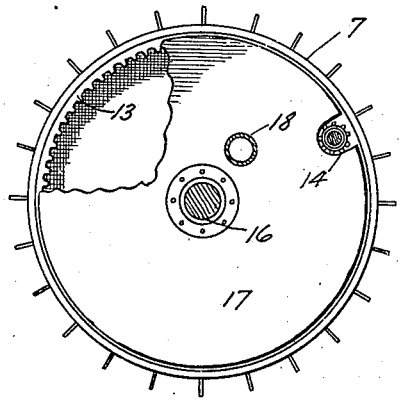
Figure 4:
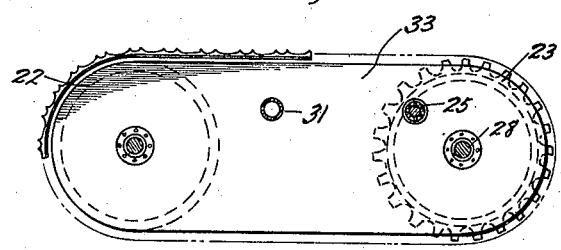

I accomplish these objects by means of the embodiments of my invention illustrated in the accompanying drawing, in which:

Figure 1 is a plan view of a wheel drive tractor. Fig. 2 is a plan view of a track laying tractor. Fig. 3 is an enlarged section as seen on the line 3—3 of Fig. 1. Fig. 4 is a section as seen on the line 4—4 of Fig. 2.

Referring more particularly to Figs. 1 and 3, the main frame of the tractor is indicated by 5. The frame is supported upon steering wheels 6 and ground traction wheels 7. Mounted upon the frame is an engine 8. The case for the transmission is indicated by 9, and the case for the propeller shaft by 10. The differential housing is indicated by 11, and the axle by 12.

The ground wheels, one of which is shown in section, have internal or annular gears indicated by 13. Meshing with the internal gear 13 is a pinion 14, which is mounted upon the driving shaft. Instead of spokes in the ground wheels disks are used to connect the hub and rim, a disk is indicated by 15. The ground wheels are journaled upon a shaft 16, and mounted upon the shaft and held against rotation is a disk 17 forming a cover for a housing inclosing the driving gears.

The exhaust of the engine 8 is carried to the rear ending in a T, one arm of which connects with the driving gear housing cover on one ground wheel, and the other arm of which connects with the driving wheel gear housing cover on the opposite ground wheel; this provides for exhausting into the driving gear housing.

Upon operation of the tractor the exhaust passes into the driving gear housing and to the atmosphere through any openings between the disk 17 and the ground wheel rim. The driving gear chamber acts as a muffler. However, the principal purpose is to keep sand, dust and mud from entering the driving gear chamber. This function it accomplishes by reason of the blast of exhaust gases through the openings. The exhaust usually carries some oil, which assists in the lubrication of the gears.

Referring particularly to Figs. 2 and 4, the main frame of a track laying tractor is indicated by 20. Traction frames are indicated by 21. Journaled in each traction frame is an idler wheel 22 and a driving sprocket 23. Sprocket 23 is provided with an annular gear 24 with which meshes a pinion 25.

Mounted on the main frame is an engine 26, which is connected by gearing and a propeller shaft to differential gearing within a housing 27. The driving axle is indicated by 28 and carries a divided shaft upon which the pinions 25 are mounted. The exhaust from the engine 26 opens directly to the atmosphere.

Geared to the engine is a blower 30 whose exhaust 31 ends in a T, one arm of which communicates with a port in a plate 33, and the other arm of which communicates with a like plate carried by the opposite traction frame. The plate 33 covers the space on one side of the track, and in coöperation therewith is a plate 34 on the opposite side forming a track housing chamber.

The blower 30 forces air into the track housing chamber and out through any openings therein, thus, keeping the track housing chamber free of sand, dust, dirt and mud.

It will be understood that the source of the blast for keeping the chambers clear of foreign material and the character of the elements forming the driving gear chamber may be varied.

What I claim is:

1. In a tractor, the combination with traveling ground traction means, driving mechanism contained therein adjacent the tread of said means, a closure plate forming with said means a housing for said mechanism with a clearance adjacent the tread of said means, and a source of gas blast communicating with said housing so as to discharge continuously through said clearance during travel of said tractor.

2. In a tractor having an engine, the combination with traveling ground traction means, of driving mechanism contained therein adjacent the tread of said means, a closure plate forming with said means a housing for said mechanism with a clearance adjacent the tread of said means, and means connecting the exhaust of said engine with said housing so as to discharge continuously through said clearance during the travel of said tractor.

3. In a tractor, the combination with a ground traction wheel, driving mechanism contained therein adjacent the tread of said wheel, a closure disk forming with said wheel a housing for said mechanism with a clearance adjacent the tread of said wheel, and a source of gas blast communicating with said housing so as to discharge through said clearance continuously.

In witness that I claim the foregoing I have hereunto subscribed my name this 11th day of June, 1919.

JAMES R. FOUCH.